(12) United States Patent
Matsuura et al.

(10) Patent No.: US 9,618,802 B2
(45) Date of Patent: Apr. 11, 2017

(54) APPARATUS AND METHOD FOR MANUFACTURING DISPLAY DEVICE

(71) Applicant: Kabushiki Kaisha Toshiba, Minato-ku (JP)

(72) Inventors: Takeshi Matsuura, Kanagawa-ken (JP);
Akira Ushijima, Kanagawa-ken (JP);
Kentaro Miyazaki, Kanagawa-ken (JP);
Takeshi Toyoshima, Kanagawa-ken (JP); Takahide Miyahara, Kanagawa-ken (JP); Takeshi Morita, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 191 days.

(21) Appl. No.: 14/027,615

(22) Filed: Sep. 16, 2013

(65) Prior Publication Data

US 2014/0284452 A1    Sep. 25, 2014

(30) Foreign Application Priority Data

Mar. 22, 2013 (JP) ................................. 2013-061155

(51) Int. Cl.
*G21K 5/10* (2006.01)
*G02F 1/1341* (2006.01)

(52) U.S. Cl.
CPC ................................. *G02F 1/1341* (2013.01)

(58) Field of Classification Search
None
See application file for complete search history.

(56) References Cited

U.S. PATENT DOCUMENTS

2004/0218135 A1* 11/2004 Lee .................. G02F 1/1341
                                                 349/156
2008/0188157 A1*  8/2008 Tashiro ............. G02F 1/1303
                                                  445/25

(Continued)

FOREIGN PATENT DOCUMENTS

CN          1165972 A      11/1997
CN          1410818 A       4/2003

(Continued)

OTHER PUBLICATIONS

Office Action issued Jan. 6, 2016 in Korean Patent Application No. 10-2014-0020377 (with English language translation).

(Continued)

*Primary Examiner* — Andrew Smyth
(74) *Attorney, Agent, or Firm* — Oblon, McClelland, Maier & Neustadt, L.L.P.

(57) ABSTRACT

According to one embodiment, an apparatus for manufacturing a display device, includes: a first holding section configured to hold a first substrate; a second holding section configured to hold a second substrate; a turning section configured to turn the first holding section such that the first substrate and the second substrate face each other; an elevation unit configured to elevate the second holding section and attach the first substrate and the second substrate via an adhesive layer; and a first radiation section configured to radiate ultraviolet rays from at least one direction of an inclined lower side of an opening of a space between the first substrate and the second substrate and an inclined upper side of the opening toward the opening.

17 Claims, 3 Drawing Sheets

(56) References Cited

U.S. PATENT DOCUMENTS

| | | | |
|---|---|---|---|
| 2008/0299860 A1* | 12/2008 | Lee | G06K 19/077 445/24 |
| 2011/0113624 A1* | 5/2011 | Harada | B32B 38/1841 29/825 |
| 2011/0155317 A1 | 6/2011 | Shinoda et al. | |
| 2012/0214896 A1* | 8/2012 | Igarashi | C08G 18/6216 522/96 |
| 2012/0325536 A1* | 12/2012 | Negoro | G02F 1/13454 174/260 |

FOREIGN PATENT DOCUMENTS

| | | |
|---|---|---|
| CN | 1441294 A | 9/2003 |
| CN | 102216833 A | 10/2011 |
| CN | 102830552 A | 12/2012 |
| CN | 202753549 U | 2/2013 |
| JP | 10-293314 A | 11/1998 |
| JP | 10-293315 A | 11/1998 |
| JP | 2001-174835 A | 6/2001 |
| JP | 2001-222017 A | 8/2001 |
| JP | 2004-226689 A | 8/2004 |
| JP | 2007-34329 | 2/2007 |
| JP | 2007-034329 A | 2/2007 |
| JP | 2008-281997 A | 11/2008 |
| JP | 2009-048214 A | 3/2009 |
| JP | 2009-237287 A | 10/2009 |
| JP | 2010-257208 A | 11/2010 |
| JP | 2011-107228 A | 6/2011 |
| JP | 2011-150332 A | 8/2011 |
| JP | 2011-170831 A | 9/2011 |
| TW | 200304016 A | 9/2003 |
| TW | 200903482 A | 1/2009 |

OTHER PUBLICATIONS

Combined Office Action and Search Report issued Dec. 2, 2015 in Taiwanese Patent Application No. 103106114 (with English language translation).

Office Action issued Sep. 27, 2016 in Korean Patent Application No. 10-2014-0020377 (with English translation).

Office Action issued on Aug. 31, 2016 in Japanese Patent Application No. 2013-061155 with English Translation.

Office Action issued on Jul. 28, 2016 in Korean Patent Application No. 10-2014-0020377 with English Translation.

Office Action issued on Jul. 11, 2016 in Taiwanese Patent Application No. 103106114 with English Translation.

Office Action issued Mar. 21, 2016 in Chinese Patent Application No. 201410073330.3 (with English translation).

Office Action issued Nov. 3, 2016 in Chinese Patent Application No. 201410073330.3 (with English translation).

* cited by examiner

APPARATUS AND METHOD FOR MANUFACTURING DISPLAY DEVICE

CROSS-REFERENCE TO RELATED APPLICATIONS

This application is based upon and claims the benefit of priority from Japanese Patent Application No. 2013-061155, filed on Mar. 22, 2013; the entire contents of which are incorporated herein by reference.

FIELD

Embodiments described herein relate generally to an apparatus and a method for manufacturing display device.

BACKGROUND

In a process of manufacturing a display device, there is a process of attaching two substrates with an adhesive agent. When the two substrates are adhered with the adhesive agent, the adhesive agent is applied onto a surface of one substrate, the adhesive agent comes in contact with a surface of the other substrate, and then the two substrates are adhered using their own weight.

DETAILED DESCRIPTION

Figure 1:
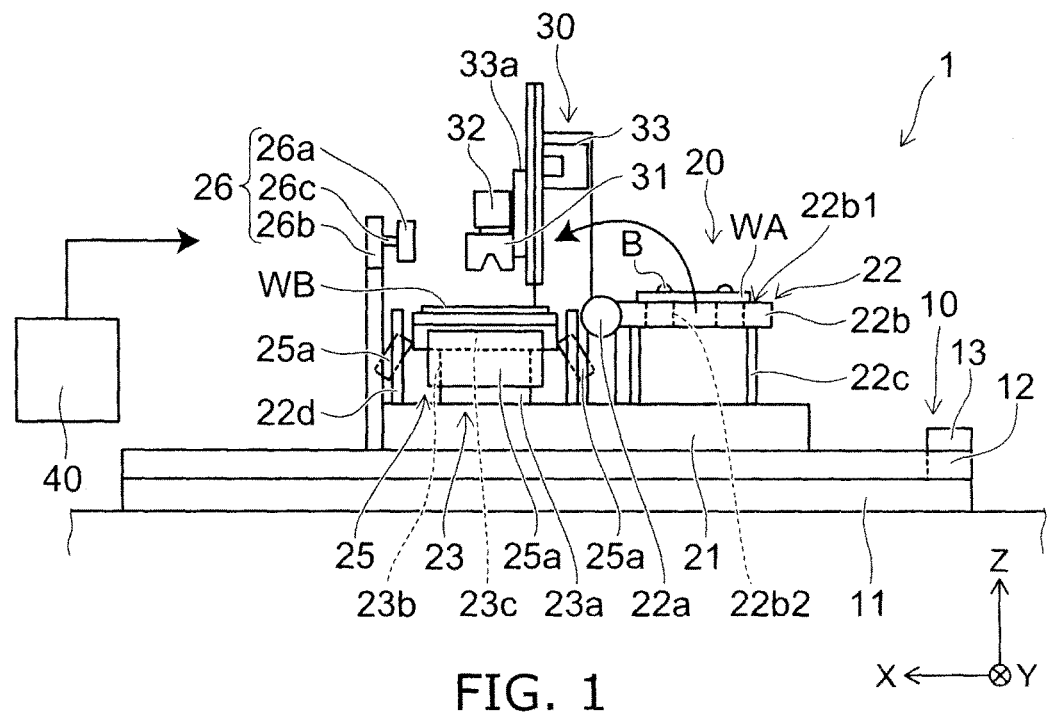
FIGS. 1 and 2 are schematic views for exemplifying an apparatus for manufacturing a display device according to an embodiment.

In general, according to one embodiment, an apparatus for manufacturing a display device, includes: a first holding section configured to hold a first substrate; a second holding section configured to hold a second substrate; a turning section configured to turn the first holding section such that the first substrate and the second substrate face each other; an elevation unit configured to elevate the second holding section and attach the first substrate and the second substrate via an adhesive layer; and a first radiation section configured to radiate ultraviolet rays from at least one direction of an inclined lower side of an opening of a space between the first substrate and the second substrate and an inclined upper side of the opening toward the opening.

In general, according to another embodiment, a method of manufacturing a display device, includes: turning a first holding section that holds a first substrate such that the first substrate and a second substrate held on a second holding section face each other; elevating the second holding section and attaching the first substrate and the second substrate via an adhesive layer; and radiating ultraviolet rays from at least one direction of an inclined lower side of an opening of a space between the first substrate and the second substrate and an inclined upper side of the opening toward the opening.

Hereinafter, an embodiment will be exemplarily described with reference to the accompanying drawings. In addition, in the drawings, like components are designated by like reference numerals, and detailed description thereof will be omitted.

In addition, arrows X, Y and Z in the respective drawings represent three perpendicular directions, and for example, the arrows X and Y represent horizontal directions and the arrow Z represents a vertical direction.

Further, in an apparatus 1 for manufacturing a display device and a method of manufacturing a display device according to the embodiment, the display device may have a pair of substrates facing each other. For example, the display device is a liquid crystal display device, an organic electro luminescence (EL) display device, or the like. In addition, a substrate WA (corresponding to an example of a first substrate) and a substrate WB (corresponding to an example of a second substrate), which will be described below, are for example a cover glass, a sensor glass, a liquid crystal module, an electro luminescence (EL) module, and so on.

Figure 2:
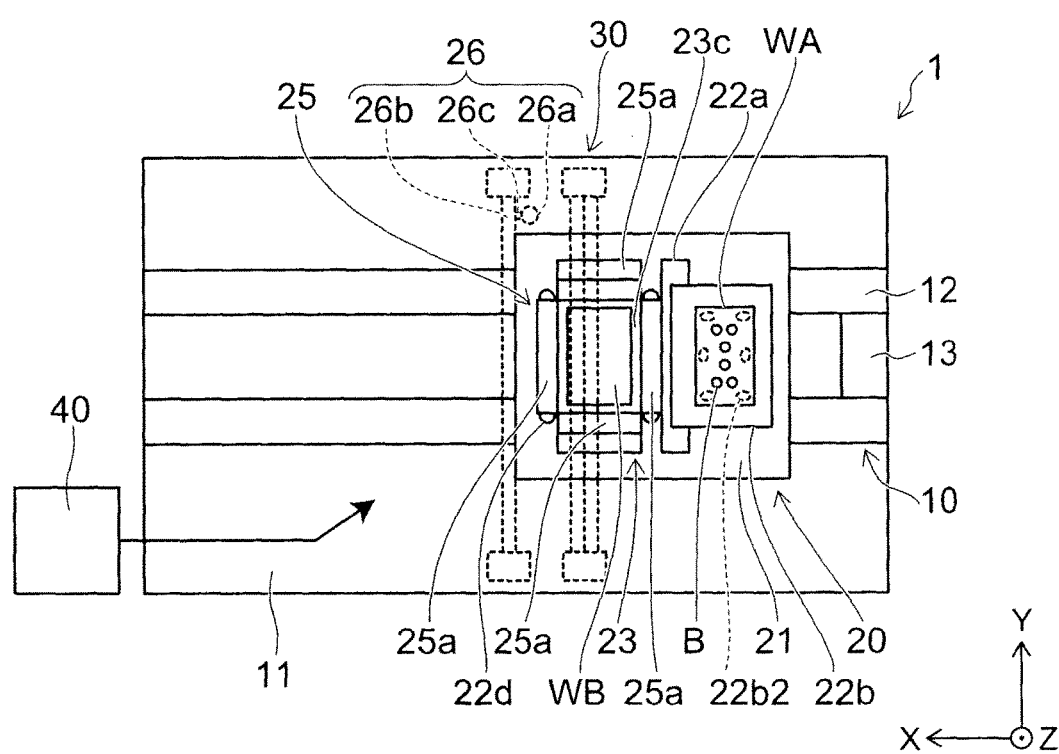

FIGS. 1 and 2 are schematic views for exemplifying the apparatus 1 for manufacturing the display device according to the embodiment.

In addition, FIG. 1 is a side view of the apparatus 1 for manufacturing the display device, and FIG. 2 is a plan view of the apparatus 1 for manufacturing the display device.

Figure 3:
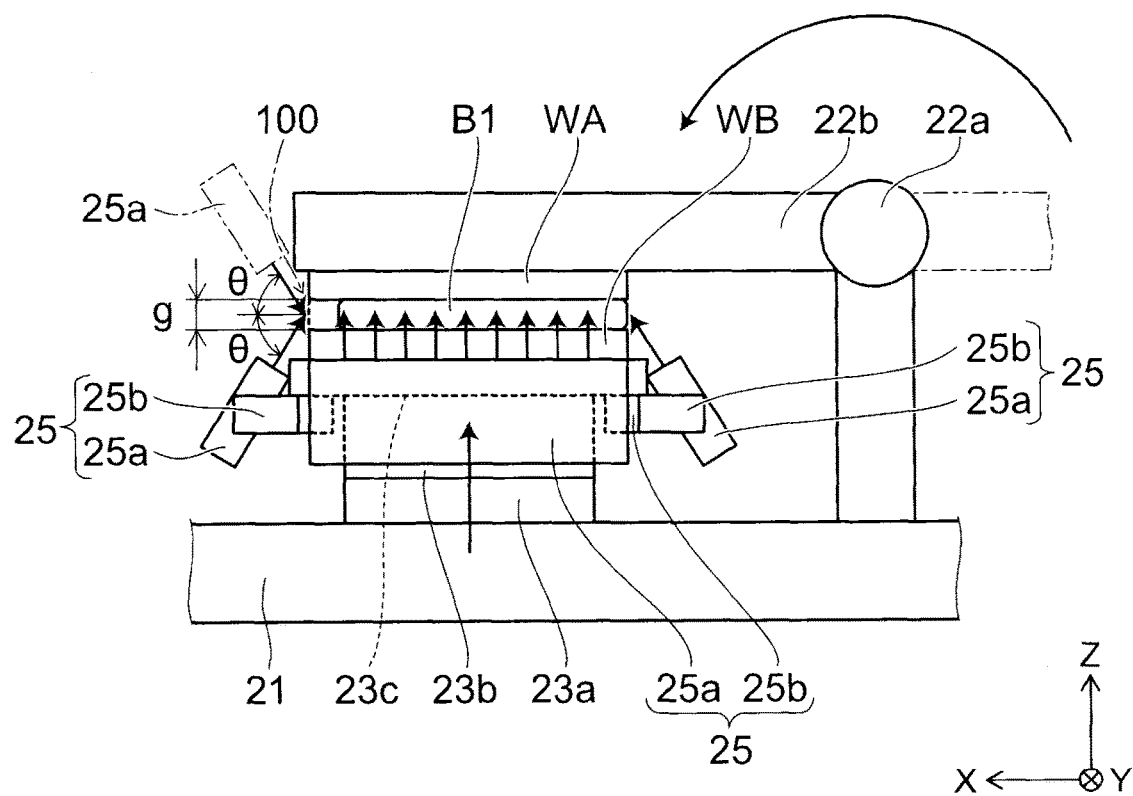
FIG. 3 is a schematic view for exemplifying a first radiation section.

FIG. 3 is a schematic view for exemplifying a first radiation section 25.

As shown in FIGS. 1 and 2, a moving unit 10, a panel alignment unit 20, a detection unit 30, and a control unit 40 are provided in the apparatus 1 for manufacturing the display device.

A base 11, a guide section 12, and a drive unit 13 are provided in the moving unit 10.

The base 11 is attached to a floor surface.

The guide section 12 is provided on an upper surface of the base 11. The guide section 12 guides movement in an X direction of the panel alignment unit 20.

The drive unit 13 is provided on the upper surface of the base 11. The drive unit 13 performs movement in the X direction of the panel alignment unit 20.

A base section 21, a substrate inversion section 22, a substrate placing section 23, the first radiation section 25 and a second radiation section 26 are provided in the panel alignment unit 20.

The base section 21 is provided at the guide section 12 to be movable in the X direction by the guide section 12 and the drive unit 13.

The substrate inversion section 22 inverts the placed substrate WA to hold the substrate placing section 23 thereon.

A turning section 22a, a substrate holding section 22b (corresponding to an example of a first holding section), a support section 22c, and a support section 22d are provided in the substrate inversion section 22.

The turning section 22a is provided at the base section 21. The turning section 22a holds a side of one end section of the substrate holding section 22b and turns the substrate holding section 22b. That is, the turning section 22a turns the substrate holding section 22b such that the substrate WA and the substrate WB face each other.

The substrate holding section 22b holds the substrate WA placed on a placing surface 22b1. The holding of the substrate WA can be performed by adsorption using, for example, a vacuum pump or the like (not shown).

In addition, a hole section 22b2 passing in a thickness direction is formed in the substrate holding section 22b. When the hole section 22b2 is formed, as will be described below, it is possible to easily radiate ultraviolet rays to an adhesive layer B1 formed between the substrate WA and the substrate WB or detect a recognition section for matching positions provided on the substrate WA and the substrate WB.

Further, the adhesive layer B1 may be formed by curing an adhesive agent (an ultraviolet ray curing adhesive agent) including an ultraviolet ray curing resin.

The support section 22c has a columnar shape, and supports the substrate holding section 22b before the turning.

As the substrate holding section 22b before the turning comes in contact with an upper end of the support section 22c, positioning in a vertical direction (a Z direction) of the substrate holding section 22b can be performed.

The number of disposed support sections 22c is not particularly limited. For example, the support sections 22c can be formed around four corners of the substrate holding section 22b. Accordingly, positional accuracy of the substrate holding section 22b in the Z direction on a horizontal surface can be improved.

The support section 22d has a columnar shape, and supports the substrate holding section 22b after the turning.

The number of disposed support sections 22d is not limited. For example, the support sections 22d can be formed around four corners of the substrate holding section 22b. Accordingly, positional accuracy of the substrate holding section 22b in the Z direction on a horizontal surface can be improved.

The substrate placing section 23 is formed at a position under the substrate holding section 22b after the turning.

The substrate placing section 23 raises the placed substrate WB to attach the substrate WB to the substrate WA held by the substrate holding section 22b. Here, the substrate placing section 23 is controlled such that a thickness dimension of the adhesive layer B1 is within a predetermined range.

A position control unit 23a, an elevation unit 23b, and a holding section 23c (corresponding to an example of a second holding section) are provided in the substrate placing section 23.

The position control unit 23a is provided on the base section 21 to perform positional control of the holding section 23c. The position control unit 23a performs the positional control in the X direction, a Y direction, the Z direction, and a θ direction (a rotational direction). The position control unit 23a may be a unit having a Z table provided on an XYθ table.

The elevation unit 23b is provided on the position control unit 23a. The elevation unit 23b elevates the holding section 23c to attach the substrate WA and the substrate WB via the adhesive layer B1.

The holding section 23c is provided on the elevation unit 23b. The holding section 23c holds the placed substrate WB. Due to the holding of the substrate WB, adsorption using, for example, a vacuum pump or the like (not shown) can be performed.

As shown in FIG. 3, the first radiation section 25 radiates ultraviolet rays toward an opening 100 of a space in which the adhesive layer B1 is formed between the substrate WA and the substrate WB.

As will be described below, when the holding section 23c is raised by the elevation unit 23b to attach the substrate WA and the substrate WB, a thickness dimension g of the adhesive layer B1 is within a predetermined range.

When the thickness dimension g of the adhesive layer B1 is within the predetermined range, a compressive strength acts on the adhesive layer B1. For this reason, while a reaction force is applied to the substrate WA and the substrate WB, the substrate WA is held by the substrate holding section 22b and the substrate WB is held by the holding section 23c. For this reason, there is no large bending at the substrate WA side and the substrate WB side. As a result, as the thickness dimension of the adhesive layer B1 is reduced, and the adhesive layer B1 is spread toward the opening 100.

Here, in the display device, a functional member such as a touch switch or the like is provided between the two substrates to accomplish multiple functions, and a novel flatness is accomplished. For this reason, the thickness dimension of the adhesive layer B1 formed between the substrate WA and the substrate WB is varied, and quality of the display device is degraded. Here, the thickness dimension g of the adhesive layer B1 is within a predetermined range.

However, since the variation occurs in the flatness of the substrate WA and the substrate WB and the flatness of the touch switch, a dimension in the thickness direction of the opening 100 is not constant. In addition, the amount of the supplied adhesive agent is also varied. For this reason, when the thickness dimension g of the adhesive layer B1 is within the predetermined range, the adhesive agent easily protrudes from the opening 100. When the adhesive agent protrudes from the opening 100, attachment of the display device to an electronic instrument may be disturbed.

For this reason, in the apparatus 1 for manufacturing the display device according to the embodiment, the first radiation section 25 is provided, and the adhesive layer B1 is cured in the vicinity of the opening 100. When the adhesive layer B1 is cured in the vicinity of the opening 100, protrusion of the adhesive agent from the opening 100 can be suppressed.

A radiation head 25a and a head holding section 25b are provided in the first radiation section 25.

For example, the radiation head 25a may include a lamp, a light emitting device (for example, a light emitting diode (LED) or the like), or the like, configured to radiate ultraviolet rays. The first radiation section 25 (the radiation head 25a) radiates the ultraviolet rays such that an irradiation surface is formed in a longitudinal direction of the opening 100. That is, the first radiation section 25 (the radiation head 25a) radiates the ultraviolet rays substantially linearly. For this reason, when the radiation head 25a has a plurality of light emitting devices, the plurality of light emitting devices are disposed in the longitudinal direction of the opening 100 in parallel.

In addition, as shown in FIG. 2, the radiation head 25a may be provided to surround the holding section 23c. In this case, the plurality of radiation heads 25a may be provided, and the radiation head 25a having a frame shape configured to surround the holding section 23c may be provided.

Further, when there is an interconnection or the like between the substrate WA and the substrate WB, protrusion of the adhesive agent is suppressed by the interconnection or the like. For this reason, the ultraviolet rays may not be radiated to a portion at which the interconnection or the like is located. That is, the radiation head 25a may not be provided to surround the holding section 23c.

However, when the radiation head 25a is provided to surround the holding section 23c, versatility can be increased.

The head holding section 25b configured to hold the radiation head 25a is provided at the holding section 23c. The substrate WB is held on the holding section 23c. For this reason, when the head holding section 25b is provided at the holding section 23c, a dimensional relation between the opening 100 and the radiation head 25a can be constantly maintained.

In addition, when a raising position of the holding section 23c is substantially constant, the head holding section 25b can be provided at the base section 21.

Here, when the ultraviolet rays are radiated from a front surface side of the opening 100, an arrival distance of the ultraviolet rays from the opening 100 may be increased, and a curing range may be increased. When the curing range is increased, distortion or the like may occur.

For this reason, in the apparatus 1 for manufacturing the display device according to the embodiment, the ultraviolet rays are radiated from a direction of at least one of an inclined lower side of the opening 100 and an inclined upper side of the opening 100 of a space between the substrate WA and the substrate WB toward the opening 100. In addition, in FIGS. 1 and 2, as an example, the ultraviolet rays are radiated from the inclined lower side of the opening 100 toward the opening 100.

In this way, when an apparatus for radiating ultraviolet rays from an inclined upper side or an inclined lower side at a predetermined angle is configured, in a process of attaching the substrate WA and the substrate WB, the ultraviolet rays can be radiated to the adhesive layer B1 to cure the adhesive layer B1 at a predetermined timing when the adhesive layer B1 between the substrates is spread toward the opening 100. Accordingly, the substrate WA and the substrate WB can be attached using a gap therebetween as a predetermined value.

While a radiation angle θ of the ultraviolet rays is not particularly limited, for example, the ultraviolet rays can be radiated from a front surface of the opening 100 toward the opening 100 at an angle of more than 0° to 45° or less.

The second radiation section 26 radiates the ultraviolet rays toward the adhesive layer B1 formed between the substrate WA and the substrate WB via the hole section 22b2 formed in the substrate holding section 22b.

As will be described below, the second radiation section 26 radiates the ultraviolet rays to a partial region of the adhesive layer B1.

A radiation head 26a and a moving unit 26b are provided at the second radiation section 26.

For example, the radiation head 26a may include a lamp, a light emitting device, or the like, configured to radiate ultraviolet rays.

The moving unit 26b is provided on the base 11 to cross the base section 21 in the Y direction.

The moving unit 26b has a guide section 26c, which is movable in the Y direction, and the radiation head 26a is provided at the guide section 26c. In addition, the radiation head 26a can be moved in the Y direction by a drive unit (not shown) via the guide section 26c.

The detection unit 30 performs measurement of the thickness dimensions of the substrate WA and the substrate WB, and detection of positions of the substrate WA and the substrate WB.

A measurement unit 31, an imaging unit 32, and a moving unit 33 are provided in the detection unit 30.

The measurement unit 31 performs measurement of the thickness dimension of the substrate WA held on the substrate holding section 22b, and measurement of the thickness dimension of the substrate WB held on the holding section 23c.

The measurement unit 31 may be, for example, a laser displacement meter or the like.

Information related to the thickness dimensions of the substrate WA and the substrate WB measured by the measurement unit 31 is transmitted to the control unit 40 and used to control the thickness dimension of the adhesive layer B1.

The imaging unit 32 images recognition sections (for example, alignment marks, shapes of corner portions, or the like) formed on the substrate WA and the substrate WB.

The imaging unit 32 may be a charge coupled device (CCD) or the like.

The positional information related to the substrate WA and the substrate WB imaged by the imaging unit 32 is transmitted to the control unit 40, and image processing is performed to calculate a positional deviation amount. The calculated positional deviation amount is used in the positional control of the substrate WB by the position control unit 23a. In addition, the imaging by the imaging unit 32 can be performed via the hole section 22b2 formed in the substrate holding section 22b.

Further, when the hole section 22b2 is unnecessarily large and the substrate holding section 22b is pressed, the substrate holding section 22b or the substrate itself is bent, and accuracy in the thickness dimension of the adhesive layer B1 is degraded. For this reason, in the apparatus 1 for manufacturing the display device according to the embodiment, the size of the hole section 22b2, which is a hole for radiating the ultraviolet rays and for performing the imaging, is set to a necessary minimum value.

The moving unit 33 is provided on the base 11 to cross the base section 21 in the Y direction.

The moving unit 33 has a guide section 33a, which is movable in the Y direction, and the measurement unit 31 and the imaging unit 32 are provided at the guide section 33a. In addition, the measurement unit 31 and the imaging unit 32 can be moved in the Y direction by a drive unit (not shown) via the guide section 33a.

Further, an adhesive agent supply apparatus (not shown) configured to supply an adhesive agent B can be provided on a surface of the substrate WA held on the substrate holding section 22b before the turning.

However, the adhesive agent supply apparatus (not shown) may be separately provided from the apparatus 1 for manufacturing the display device to improve processing capability of the apparatus 1 for manufacturing the display device and further productivity of the display device.

The control unit 40 controls operations of the respective components provided at the apparatus 1 for manufacturing the display device.

The control unit 40 controls, for example, movement of a position in the X direction of the panel alignment unit 20 by the drive unit 13, holding of the substrate WA by the substrate holding section 22b, turning of the substrate holding section 22b by the turning section 22a, elevation (movement in the Z direction) of the substrate WB by the elevation unit 23b, holding of the substrate WB by the holding section 23c, radiation of the ultraviolet rays by the radiation head 25a, radiation of the ultraviolet rays by the radiation head 26a, movement of a position in the Y direction of the radiation head 26a by the moving unit 26b, measurement of the thickness dimension by the measurement unit 31, imaging of the recognition section by the imaging unit 32, and so on.

Here, the control unit 40 controls the elevation unit 23b based on information from the measurement unit 31 such that the thickness dimension of the adhesive layer B1 is within a predetermined range. For example, based on the thickness dimension of the substrate WA and the thickness dimension of the substrate WB, a raising amount by the elevation unit 23b is controlled such that the thickness dimension of the adhesive layer B1 is within a predetermined range. In addition, details of control of the thickness dimension of the adhesive layer B1 will be described later. Further, the control unit 40 radiates the ultraviolet rays from the radiation head 25a based on the raising amount of the elevation unit 23b.

Next, a method of manufacturing a display device will be exemplarily described with operations of the apparatus 1 for manufacturing the display device according to the embodiment.

Figure 4:
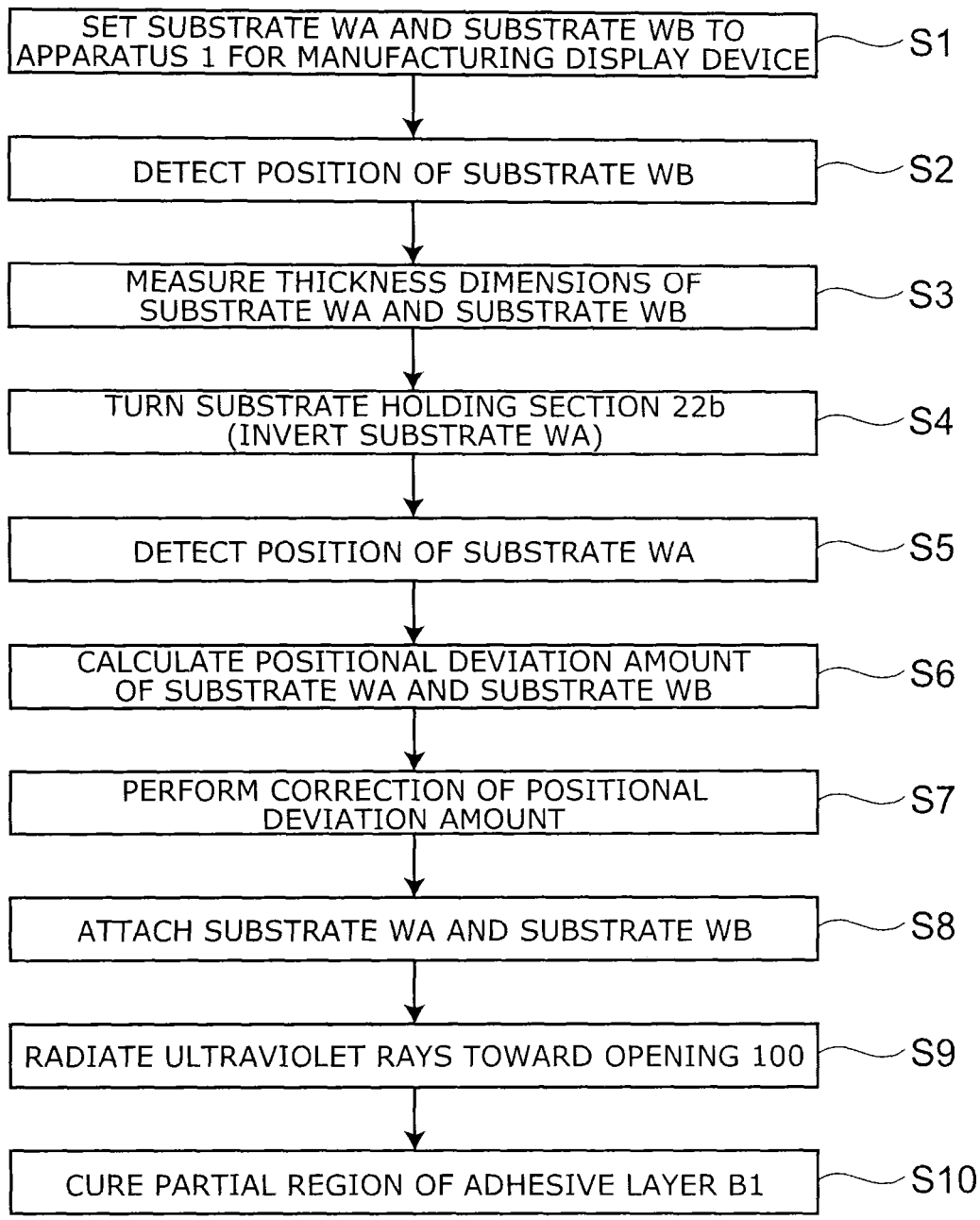
FIG. 4 is a flowchart for illustrating operations of the apparatus for manufacturing the display device and a method of manufacturing the display device.

FIG. 4 is a flowchart for illustrating operations of the apparatus 1 for manufacturing the display device and the method of manufacturing the display device.

As shown in FIG. 4, first, in step S1, the substrate WA and the substrate WB are set to the apparatus 1 for manufacturing the display device.

For example, the substrate WA is placed on the substrate holding section 22b and the substrate WB is placed on the holding section 23c.

In addition, the adhesive agent B is applied on a surface of the substrate WA in a droplet shape. The adhesive agent B may be applied by an adhesive agent application apparatus, which is separately provided and not shown. The adhesive agent B may be an adhesive agent (an ultraviolet ray curing adhesive agent) including an ultraviolet ray curing resin.

The substrate WA is placed such that a surface opposite to a surface on which the adhesive agent B is applied is directed toward the substrate holding section 22b.

Next, the substrate WA is held on the substrate holding section 22b and the substrate WB is held on the holding section 23c.

Next, in step S2, a position of the substrate WB is detected.

For example, movement in the X direction of the panel alignment unit 20 (the substrate WB) is performed by the drive unit 13, movement in the Y direction of the imaging unit 32 is performed by the moving unit 33, and a recognition section formed on the substrate WB is imaged by the imaging unit 32.

Next, in step S3, the thickness dimensions of the substrate WA and the substrate WB are measured.

For example, measurement of the thickness dimension of the substrate WA held on the substrate holding section 22b and measurement of the thickness dimension of the substrate WB held on the holding section 23c are performed by the measurement unit 31.

For example, movement in the X direction of the panel alignment unit 20 (the substrate WA and the substrate WB) is performed by the drive unit 13, movement in the Y direction of the measurement unit 31 is performed by the moving unit 33, and the thickness dimensions of the substrate WA and the substrate WB are measured by the measurement unit 31.

In addition, in a state in which the substrate WA and the substrate WB are horizontal, when a variation in a thickness dimension is large, a plurality of places of the substrate having a large variation in thickness dimension may be measured and their average value may be used as a measurement result.

Next, in step S4, the substrate holding section 22b is turned (the substrate WA is inverted).

For example, the substrate holding section 22b is turned by the turning section 22a and the substrate holding section 22b is supported by the support section 22d.

Next, in step S5, a position of the substrate WA is detected.

For example, movement in the X direction of the panel alignment unit 20 (the substrate WA) is performed by the drive unit 13, movement in the Y direction of the imaging unit 32 is performed by the moving unit 33, and the recognition section formed on the substrate WA is imaged by the imaging unit 32.

In addition, the imaging by the imaging unit 32 can be performed via the hole section 22b2 formed in the substrate holding section 22b.

Next, in step S6, a positional deviation amount between the substrate WA and the substrate WB is calculated.

For example, the positional deviation amount between the substrate WA and the substrate WB is calculated from the positional information of the substrate WB detected in step S3 and the positional information of the substrate WA detected in step S6. In addition, when a positional deviation value exceeds a predetermined value, at least one of the substrate WA and the substrate WB is reset.

A positioning apparatus (not shown) configured to position the substrates WA and WB using one side of an exterior thereof as a reference such that the positions of the substrates WA and WB are within a predetermined range may be provided on the substrate holding section 22b and the holding section 23c. Then, re-positioning may be performed by the positioning apparatus (not shown).

Next, in step S7, compensation of the positional deviation amount is performed.

For example, positions in the X direction, the Y direction, the Z direction, and the θ direction (the rotational direction) of the holding section 23c are adjusted by the position control unit 23a via the elevation unit 23b. That is, the position of the substrate WB is matched to the position of the substrate WA.

Next, in step S8, the substrate WA and the substrate WB are adhered.

For example, the holding section 23c is raised by the elevation unit 23b to attach the substrate WA and the substrate WB.

When an apex section of the adhesive agent B having the droplet shape disposed on the substrate WA comes in contact with the substrate WB, the adhesive agent B having the droplet shape is flared to form the adhesive layer B1.

Here, the thickness dimension of the adhesive layer B1 formed between the substrate WA and the substrate WB may be varied and quality of the display device may be degraded.

For this reason, the raising position (the position in the Z direction) of the holding section 23c is controlled such that the thickness dimension of the adhesive layer B1 is within a predetermined range.

For example, it will be appreciated that the position in the Z direction of the placing surface 22b1 of the substrate holding section 22b and the position in the Z direction of the holding section 23c are previously measured.

In addition, it will be appreciated that the thickness dimensions of the substrate WA and the substrate WB are measured in step S3.

For this reason, the raising position of the holding section 23c, which may be a desired thickness dimension of the adhesive layer B1, can be calculated from these values. That is, the raising amount can be calculated by the elevation unit 23b.

In addition, these calculations can be calculated by the control unit 40. Then, based on the calculated raising amount, the elevation unit 23b is controlled by the control unit 40 such that the thickness dimension of the adhesive layer B1 is within a predetermined range.

Further, in step S9, the ultraviolet rays are radiated from at least one direction of the inclined lower side of the opening 100 and the inclined upper side of the opening 100 toward the opening 100.

The timing at which the ultraviolet rays are radiated can be determined based on, for example, the raising amount of the elevation unit 23b. For example, a dimension in a thickness direction of the opening 100 can be calculated based on the raising amount of the elevation unit 23b, and the ultraviolet rays can be radiated when the calculated dimension in the thickness direction of the opening 100 arrives at a predetermined value. In addition, the dimension in the thickness direction of the opening 100 can be calculated by time management, and the ultraviolet rays can be radiated when the calculated dimension in the thickness direction of the opening 100 arrives at a predetermined value.

Next, in step S10, a partial region of the adhesive layer B1 is cured.

That is, the substrate WA and the substrate WB are temporarily stopped.

For example, the ultraviolet rays are radiated to a partial region of the adhesive layer B1 formed between the substrate WA and the substrate WB by the radiation sections 26.

In this case, movement in the X direction of the panel alignment unit 20 (the substrate WA and the substrate WB) is performed by the drive unit 13, movement in the Y direction of the radiation head 26a is performed by the moving unit 26b, and the ultraviolet rays are radiated toward the adhesive layer B1 via the hole section 22b2 formed in the substrate holding section 22b.

As the partial region of the adhesive layer B1 is cured, the thickness dimension of the adhesive layer B1 can be maintained.

The substrate WA and the substrate WB that cure the partial region of the adhesive layer B1 are extracted from the apparatus 1 for manufacturing the display device, and the entire region of the adhesive layer B1 is cured by the ultraviolet ray radiation apparatus or the like.

That is, the method of manufacturing the display device according to the embodiment may include the following processes:

a process of turning the substrate holding section 22b that holds the substrate WA such that the substrate WA and the substrate WB held on the holding section 23c face each other;

a process of elevating the holding section 23c and attaching the substrate WA and the substrate WB via the adhesive layer B1; and a process of radiating the ultraviolet rays from at least one direction of the inclined lower side of the opening 100 and the inclined upper side of the opening 100 in the space between the substrate WA and the substrate WB toward the opening 100.

In addition, in the process of radiating the ultraviolet rays toward the opening 100, the ultraviolet rays are radiated such that the irradiation surface is formed in the longitudinal direction of the opening 100.

Further, in the process of radiating the ultraviolet rays toward the opening 100, the radiation of the ultraviolet rays is started based on the elevation amount of the holding section 23c.

According to the embodiment described as above, the apparatus for manufacturing the display device and the method of manufacturing the display device that are capable of suppressing protrusion of the adhesive agent can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An apparatus for manufacturing a display device, comprising:
a first holding section configured to hold a first substrate;
a second holding section configured to hold a second substrate;
a turning section configured to turn the first holding section such that the first substrate and the second substrate face each other;
an elevation unit configured to elevate the second holding section and attach the first substrate and the second substrate via an adhesive layer;
a first radiation section configured to radiate ultraviolet rays from an inclined lower side of an opening of a space between the first substrate and the second substrate and toward the opening, the first radiation section provided at the second holding section, and the elevation unit configured to elevate the second holding section and the first radiation section together;
a measurement unit configured to measure a thickness dimension of the first substrate held on the first holding section and a thickness dimension of the second substrate held on the second holding section; and
a control unit configured to calculate a thickness dimension of the adhesive layer based on the measured thickness dimension of the first substrate, the measured thickness dimension of the second substrate, and an elevation position of the second holding section, the control unit configured to control the elevation unit based on the calculated thickness dimension of the adhesive layer, the control unit configured to control the first radiation section, and the first radiation section radiating the ultraviolet rays when the thickness dimension of the adhesive layer is within a predetermined range based on the elevation position of the second holding section.

2. The apparatus according to claim 1, wherein the first radiation section radiates the ultraviolet rays such that an irradiation surface is formed in a longitudinal direction of the opening.

3. The apparatus according to claim 1, wherein the first radiation section linearly radiates the ultraviolet rays.

4. The apparatus according to claim 1, wherein the first radiation section has a plurality of light emitting devices, and the plurality of light emitting devices are disposed in the longitudinal direction of the opening in parallel.

5. The apparatus according to claim 1, wherein the first radiation section is provided to surround the second holding section.

6. The apparatus according to claim 5, wherein the first radiation section has a radiation head having a frame shape that surrounds the second holding section.

7. The apparatus according to claim 5, wherein the first radiation section has a plurality of radiation heads that surround the second holding section.

8. The apparatus according to claim 1, wherein the first radiation section radiates the ultraviolet rays from a front surface of the opening toward the opening at an angle of more than 0° to 45° or less.

9. The apparatus according to claim 1, further comprising:
an imaging unit configured to image recognition sections formed on the first substrate and the second substrate; and
a position control unit configured to perform positional control on the second holding section based on information from the imaging unit.

10. The apparatus according to claim 1, further comprising a second radiation section configured to radiate the ultraviolet rays to a partial region of the adhesive layer.

11. The apparatus according to claim 10, wherein the second radiation section radiates the ultraviolet rays to the partial region of the adhesive layer via a hole section formed in the first holding section.

12. A method of manufacturing a display device, comprising:
turning a first holding section that holds a first substrate such that the first substrate and a second substrate held on a second holding section face each other; elevating the second holding section and attaching the first substrate and the second substrate via an adhesive layer;
radiating ultraviolet rays from at least one direction of an inclined lower side of an opening of a space between the first substrate and the second substrate and an inclined upper side of the opening toward the opening, the ultraviolet rays being radiated directly to the opening; and
measuring a thickness dimension of the first substrate and a thickness dimension of the second substrate, wherein in the attaching of the first substrate and the second substrate, a thickness dimension of the adhesive layer is calculated based on the measured thickness dimension of the first substrate, the measured thickness dimension of the second substrate and an elevation position of the second holding section, the elevation position of the second holding section being controlled based on the calculated thickness dimension of the adhesive layer, and
in the radiating of the ultraviolet rays, the ultraviolet rays are radiated when the thickness dimension of the adhesive layer is within a predetermined range based on the elevation position of the second holding section.

13. The method according to claim 12, wherein, in the radiating of the ultraviolet rays toward the opening, the ultraviolet rays are radiated such that an irradiation surface is formed in a longitudinal direction of the opening.

14. The method according to claim 12, wherein, in the radiating of the ultraviolet rays toward the opening, the radiation of the ultraviolet rays is started based on an elevation amount of the second holding section.

15. The method according to claim 12, wherein, in the radiating of the ultraviolet rays toward the opening, the radiation of the ultraviolet rays is started when a dimension in a thickness direction of the opening arrives at a predetermined value.

16. The method according to claim 12, wherein, in the radiating of the ultraviolet rays toward the opening, the ultraviolet rays are radiated from a front surface of the opening toward the opening at an angle of more than 0° to 45° or less.

17. The method according to claim 12, further comprising curing a partial region of the adhesive layer and temporarily stopping the first substrate and the second substrate.

* * * * *